United States Patent [19]

Cohen

[11] Patent Number: 4,784,765
[45] Date of Patent: Nov. 15, 1988

[54] AQUARIUM OXYGENATOR

[76] Inventor: Merrill Cohen, 180L Penrod Ct., Glen Burnie, Md. 21061

[21] Appl. No.: 860,321

[22] Filed: May 2, 1986

[51] Int. Cl.$^4$ .............................................. C02F 1/72
[52] U.S. Cl. .................................. 210/169; 210/205; 422/190; 222/1
[58] Field of Search .............. 210/759, 763, 169, 192, 210/198.1, 205, 206; 422/190; 222/1

[56] References Cited

U.S. PATENT DOCUMENTS

| Re. 26,529 | 3/1969 | Lichtenberger et al. | 221/1 X |
|---|---|---|---|
| 2,721,788 | 10/1955 | Schad | 23/281 |
| 3,482,736 | 12/1969 | Green | 222/94 |
| 3,492,093 | 1/1970 | Start et al. | 23/204 |
| 3,702,298 | 11/1972 | Zsoldos et al. | 210/759 X |
| 3,831,811 | 8/1974 | Becker | 222/1 |
| 3,917,461 | 11/1975 | Kühl et al. | 422/190 |
| 3,970,554 | 7/1976 | Fischer et al. | 210/759 X |
| 4,311,598 | 1/1982 | Verachtert | 210/759 X |
| 4,440,648 | 4/1984 | Gerlach et al. | 210/759 |
| 4,466,556 | 8/1984 | Söchting | 222/1 |
| 4,549,969 | 10/1985 | Gerlach et al. | 210/759 |

OTHER PUBLICATIONS

Advertising Material: Sochting Oxydators. (no date).

Primary Examiner—Tom Wyse
Attorney, Agent, or Firm—Berman & Aisenberg & Platt

[57] ABSTRACT

An aquarium oxygenator has a container inverted into the apex of a ceramic cone-shaped ceramic structure which rests on the floor of an aquarium. Hydrogen peroxide solution (15%) in the container is decomposed to form oxygen and water in the presence of a catalyst pellet of finely divided silver admixed with clay. Hydrogen peroxide seeps into the cone, and, in the absence of the catalyst, reacts with organic material in the water of the aquarium to produce oxygen which bubbles through an aperture in the side of the cone-shaped structure into the main body of water in the aquarium.

5 Claims, 1 Drawing Sheet

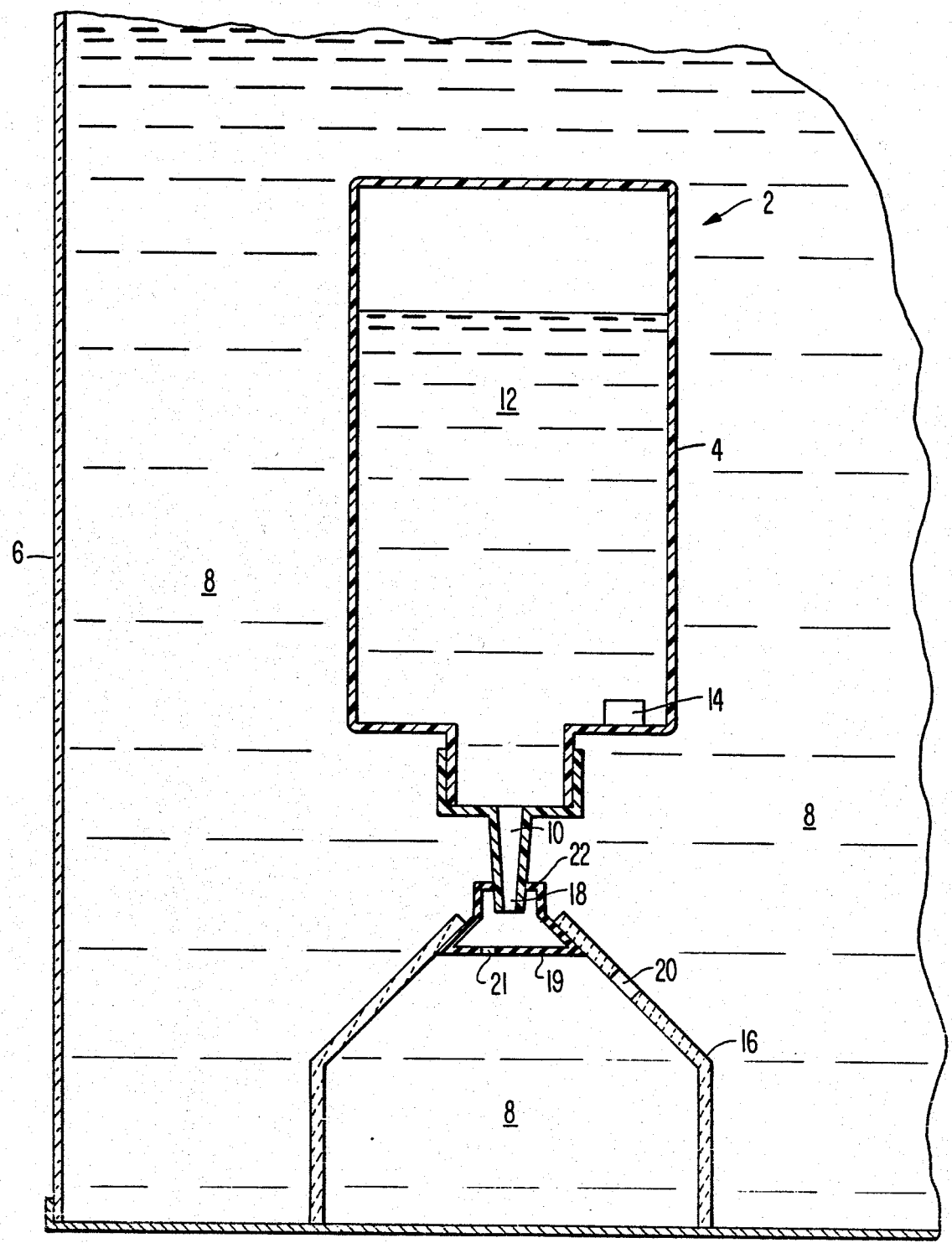

AQUARIUM OXYGENATOR

FIELD OF THE INVENTION

Equipment is provided for dispensing oxygen in an aquarium by decomposing hydrogen peroxide.

BACKGROUND OF THE INVENTION

Water in an aquarium needs to contain dissolved oxygen in order to support fish life. Known systems for oxygenating aquarium water suffer from various disadvantages. For example, air may be bubbled through the water, but control of bubble systems is difficult.

Dissolved oxygen may be provided by controlled decomposition of a solution of hydrogen peroxide, and a system of this type is shown by Sochting, U.S. Pat. No. 4,466,556. The system of the Sochting patent is complex, and has at least two steps (each conducted in a separate container) of catalytic decomposition of hydrogen peroxide. Sochting uses a catalyst of activated charcoal or manganese dioxide bound to a suitable carrier to aid in each stage of the hydrogen peroxide decomposition. The Sochting apparatus employs a pellet of this catalyst inside the container, and the container either stands inside a dish or another container made of a ceramic which has catalyst embedded in it, or has such a catalyst-containing dish mounted on it. The catalyst-containing ceramic decomposes the peroxide into oxygen and water.

SUMMARY OF THE INVENTION

The invention is a simple, inexpensive oxygenator for use in an aquarium, or other environment, where a body of water is continuously required to be kept clean.

A container, such as a bottle, having a narrow open tip is inverted into the top of an open-based ceramic cone-shaped structure which stands on the floor of an aquarium, the bottle being removably secured to the cone with a gasket connection. Hydrogen peroxide solution (15%) and a catalyst (of finely divided silver admixed with clay and shaped into pellet form) are placed in the bottle, and the bottle is inverted into the the top of the cone. Oxygen, produced by decomposition of hydrogen peroxide in the presence of catalyst, creates pressure in the bottle to allow hydrogen peroxide to seep through the open tip of the inverted bottle into the water of the aquarium surrounded by the cone. The hydrogen peroxide reacts, in the absence of catalyst, with organic material in the aquarium water surrounded by the cone, forming oxygen which bubbles into the main body of water in the aquarium through a hole in the surface of the cone. Thus, a one-step catalytic decomposition of hydrogen peroxide is provided, and this is followed by further oxidative decomposition in the absence of added catalyst.

An object of the invention is to provide a simple, inexpensive method and apparatus for controlled dispensing of oxygen in an aquarium.

Another object of the invention is to provide a catalyst useful for the decomposition of hydrogen peroxide.

A further object of the invention is to provide a one-step catalytic method for decomposing hydrogen peroxide.

BRIEF DESCRIPTION OF THE DRAWING

FIG. 1 is a cross-sectional view of the apparatus of the invention.

DETAILED DESCRIPTION OF THE INVENTION

According to the invention, an oxygenator is placed in water in an aquarium to release oxygen into the water to support fish life. Referring to FIG. 1, oxygenator 2 has a container, such as a bottle 4, inverted in an aquarium 6 containing water 8. Outlet 10, having a narrow open tip 18 at the mouth of the bottle, is at the lower end of inverted container 4. Container 4 holds hydrogen peroxide 12 and a catalyst pellet 14. Container 4 is inverted and secured by gasket 22 into the apex of an open-based ceramic cone 16 which rests on the floor of the aquarium. Part of the hydrogen peroxide in the container is decomposed (in contact with catalyst) into oxygen and water and, due to the positive pressure exerted by released oxygen, a portion of the hydrogen peroxide seeps through an opening in the tip 18 of inverted container 4 and spreads through a small aperture 21 over top surface 19 of cone 16 and into the water 8 of aquarium 6 surrounded by cone 16. Water 8 contains dissolved or suspended organic material, as is usually found in water in an aquarium, and the organic material in the water reacts, in the absence of catalyst, with the controlledly-released hydrogen peroxide to liberate oxygen. The oxygen bubbles from the area within the cone through aperture 20 into the main body of water in the aquarium. The cone is suitably made of inexpensive, ceramic material which is non-toxic and of sufficient weight to hold container 4 without tipping. The cone is preferably an open-based truncated cone, to enable ready attachment of the gasket, and is simple to manufacture. Aperture 20 in the surface of the cone is large enough to allow the oxygen to bubble out freely and to allow water from the main body of the aquarium to enter the section surrounded by the cone. Aperture 21, which is smaller than aperture 20, allows hydrogen peroxide to seep onto surface 19 on the underside of gasket 22. Gasket 22 is preferably made of flexible plastic material, and surface 19 is preferably lines with clay to seal surface 19 to the sides of the cone. Aperture 21 pierces surface 19.

The container is conveniently a plastic bottle which has a screw-on cap and a spout (attached to the screw-on cap) having a narrow opening in the tip. The cap is easily removed to refill the bottle, and the capped, filled bottle is readily inverted into the top of the cone. Any container which can be arranged to have an outlet at the bottom may be used, but the container described is a preferred example.

In use, container 4 is filled with a solution of hydrogen peroxide (preferably having a concentration of 15%), a catalyst pellet is added, and the container is inverted into the apex of the cone-shaped ceramic structure which stands on the floor of the aquarium. The catalyst pellet, which is porous, is preferably made from finely divided 99.9% pure silver (which passes through a 325 mesh screen) admixed with clay. As the hydrogen peroxide decomposes at a controlled rate in the presence of catalyst, oxygen collects in the upper part of the inverted container, and the positive pressure thus produced in the container allows hydrogen peroxide to seep out of the container through tip 18, and through aperture 21 onto the underside 19 of the top of cone 16. Inverted container 4 is conveniently secured into the top of cone 16 by gasket 22, which prevents leakage between the container and the cone. The hydrogen peroxide which has seeped through aperture 21 into the water of the aquarium within the cone, reacts with the organic material in the water to release oxygen which bubbles through aperture 20 in the surface of the cones and out into the main part of the aquarium.

Good aquarium management requires decomposition of the hydrogen peroxide to oxygen and water without allowing the fish to come in contact with undecomposed hydrogen peroxide. The ceramic cone protects the fish from the hydrogen peroxide which escapes from the container into the water, the hole in the cone allowing the oxygen to bubble into the water containing the fish in the main body of the aquarium.

Container 4 is suitably made of inert material such as plastic or glass; cone-shaped ceramic structure 16, which is porous, is suitably made of unglazed ceramic, such as clay, as described in the example. The ceramic structure, described herein as a cone, may be of any suitable hollow shape, for example, it may alternatively be hemispherical. The catalyst pellets are appropriately made as in the following example. One catalyst pellet is typically used in a 4 oz. botttle of 15% hydrogen peroxide. One oxygenator is generally appropriate for every thirty gallons of water.

The chemical preparation of oxygen in situ results in a greater proportion of dissolved oxygen in the water than that obtained using mechanical aeration. Tests based on normal aquarium practice of one inch of fish per gallon of water in aquarium without aeration, and two inches of fish per gallon of water in aquariums with aeration, and two inches of fish per gallon of water in aquariums with aeration, the aquariums being kept at 78° F. with lighting for 14 hours per day, show that using the method described herein results in higher levels of dissolved oxygen than those obtainable in similarly stocked aquariums using mechanical aeration and operated under the same conditions. Reaction rates increase with increased temperature.

EXAMPLE 1

Catalyst pellets are made by thoroughly mixing 1 gram of powdered silver (−325 mesh, 99.9% purity) with 1 tablespoon of liquid clay slip. The mixture is air-dried on a plaster slab to the consistency of a paste or dough, rolled into 3/16" rolls, cut into pieces ⅛" long, air-dried for 2 days, fired for 1 hour at low temperature, and then fired for 2 hours at medium temperature. Yield: 100 catalyst pellets. Any pellet shape may be used which does not block the peroxide outflow aperture leading into the cone.

EXAMPLE 2

To make a cone-shaped ceramic structure, clay slip is poured into a mold and allowed to harden for approximately four hours. The cone is removed from the mold and trimmed. Apertures are made in the cone for hydrogen peroxide inflow and for oxygen outflow. The cone is air-dried and fired in a kiln according to conventional procedures known to those skilled in the art.

Only a single step of catalytic decomposition of hydrogen peroxide, in the container, is provided. A second portion of hydrogen peroxide is decomposed in the aquarium in the absence of catalyst pellets. The process uses simple, inexpensive equipment and only one step of catalytic decomposition. When hydrogen peroxide in the bottle is used up, the bottle may be refilled with, e.g., 15% hydrogen peroxide. If oxygen stops bubbling out of the cone while peroxide remains in the bottle, the catalyst pellet should be replaced with a fresh catalyst pellet.

By using the oxygenator of this invention, slime and algae do not build up on the aquarium glass, and other parts remain clean for long periods of time. Additional aeration is not needed. Filters need less frequent cleaning or changing. The high oxygen level provided promotes a clean, healthy aquarium. If the aquarium is very dirty before starting to use the oxygenator, two catalyst pellets may be used in a 4 oz. bottle of peroxide. As the aquarium becomes cleaner with use of the oxygenator of the invention, then only one catalyst pellet is needed. In a clean aquarium environment, the oxygenator will last longer between refills of peroxide and change of catalyst than in a dirty aquarium environment.

Variations and modifications may be effected within the scope of the invention as described above, and as defined in the appended claims:

What is claimed is:

1. Apparatus for dispensing oxygen by decomposing hydrogen peroxide in an aquarium containing water, comprising: a container holding hydrogen peroxide solution and a catalyst comprising 99.9% pure powdered metallic silver which passes through a size 325 mesh screen, an outlet from the container connecting into the top of an open-based ceramic structure, wherein a first portion of hydrogen peroxide is catalytically decomposed in the container to form oxygen and water, pressure generated by the presence of oxygen in the container forces a second portion of hydrogen peroxide to seep through the outlet into the water surrounded by the ceramic structure and to decompose to produce oxygen in the presence of organic material dissolved in said water and in the absence of said catalyst.

2. Apparatus of claim 1 further comprising an aperture through a surface of the ceramic structure, wherein said oxygen formed by decomposition of the second portion of hydrogen peroxide flows through said aperture into the water in the aquarium outside the ceramic structure, and water in the aquarium flows through said aperture into the volume enclosed by the ceramic structure.

3. Apparatus of claim 1 wherein the ceramic structure rests on a floor of the aquarium.

4. Apparatus of claim 1 wherein the outlet from the container is secured to the ceramic structure by a connection comprising a gasket.

5. Apparatus for dispensing oxygen, useful for a water-containing aquarium, the apparatus comprising:
a container having an outlet;
hydrogen peroxide solution and catalyst in the container, said catalyst comprising 99.9 percent pure metallic silver powder having a particle size of −325 mesh, said catalyst constituting means for decomposing hydrogen peroxide in the container into oxygen and water;
an open-based ceramic structure having a top portion comprising an inlet communicating with the outlet from the container; and
means for conveying material through the outlet from the container into the inlet of the ceramic structure without intermediate contact with water in the aquarium;
wherein pressure generated by oxygen formed in the container is sufficient to force a portion of hydrogen peroxide to pass from the outlet of the container through the inlet in the top portion of the ceramic structure into aquarium water surrounded by the ceramic structure, and oxygen is produced by reaction of said portion of hydrogen peroxide with organic material in the water.

* * * * *